United States Patent
Gustafson

(10) Patent No.: US 6,698,211 B2
(45) Date of Patent: Mar. 2, 2004

(54) NATURAL GAS FUEL STORAGE AND SUPPLY SYSTEM FOR VEHICLES

(75) Inventor: Keith Gustafson, Waleska, GA (US)

(73) Assignee: Chart Inc., Burnsville, MN (US)

( * ) Notice: Subject to any disclaimer, the term of this patent is extended or adjusted under 35 U.S.C. 154(b) by 68 days.

(21) Appl. No.: 10/162,125

(22) Filed: Jun. 4, 2002

(65) Prior Publication Data

US 2003/0221433 A1 Dec. 4, 2003

(51) Int. Cl.[7] .................................................. F17C 9/02
(52) U.S. Cl. .......................................... 62/50.2; 62/53.2
(58) Field of Search ........................... 62/7, 45.1, 48.1, 62/50.1, 50.2, 50.3, 53.2

(56) References Cited

U.S. PATENT DOCUMENTS

| | | |
|---|---|---|
| 4,406,129 A | 9/1983 | Mills |
| 4,531,497 A | 7/1985 | Smith |
| 5,163,409 A | 11/1992 | Gustafson et al. |
| 5,228,295 A | 7/1993 | Gustafson |
| 5,315,831 A | 5/1994 | Goode et al. |
| 5,421,161 A | 6/1995 | Gustafson |
| 5,421,162 A | 6/1995 | Gustafson et al. |
| 5,477,690 A | 12/1995 | Gram |
| 5,533,492 A | 7/1996 | Willey et al. |
| 5,572,875 A | 11/1996 | Gustafson |
| RE35,874 E | 8/1998 | Neeser et al. |
| 5,884,488 A | 3/1999 | Gram et al. |
| 5,887,567 A | 3/1999 | White et al. |
| 6,058,713 A | 5/2000 | Bowen et al. |
| 6,125,637 A | 10/2000 | Bingham et al. |

*Primary Examiner*—Henry Bennet
*Assistant Examiner*—Malik N. Drake
(74) *Attorney, Agent, or Firm*—Piper Rudnick

(57) ABSTRACT

A natural gas fuel storage and supply system, particularly suited for use in vehicles powered by liquid natural gas (LNG), includes an insulated tank containing a supply of LNG with a headspace there above. A pump and a vaporizer are in circuit between the tank and the engine of the vehicle. When activated, the pump pressurizes LNG from the tank and directs it to the vaporizer where gaseous LNG is produced. The pressurized gaseous LNG is routed to the engine where it is consumed as fuel. An economizer circuit communicates with the headspace of the tank and includes a regulator, a control valve and a flow control device. The control valve opens when the vehicle engine is in operation and the regulator opens when the pressure in the tank exceeds a predetermined level so that LNG vapor from the tank headspace flows to the vehicle engine air inlet where it is consumed. The flow control device, which may be an orifice or a flow control valve, is set to prevent the LNG vapor and air mixture created at the air intake from being combustable in the vehicle engine.

19 Claims, 2 Drawing Sheets

NATURAL GAS FUEL STORAGE AND SUPPLY SYSTEM FOR VEHICLES

BACKGROUND OF THE INVENTION

The invention relates generally to cryogenic fluid storage and delivery systems and, more particularly, to a vehicle-mounted system for storing liquid natural gas and supplying natural gas fuel to the engine of the vehicle.

Interest in the use of liquid natural gas (LNG) as a fuel for motor vehicles has increased dramatically in recent years. Several factors have influenced this. LNG is relatively inexpensive and provides an alternative to fuel oil from foreign sources. In addition, it burns very cleanly, making it much easier for fleets to meet more restrictive pollution emission standards.

LNG fuel is typically dispensed in liquid form to LNG-powered vehicles from stations that store the LNG in bulk tanks. The LNG is stored as a liquid in tanks mounted onboard the vehicles because such an arrangement reduces the space necessary to contain the fuel. Given that LNG is a cryogenic fluid, and thus has a boiling point below $-150°$ F., the vehicle tanks must be well insulated. Vehicle-mounted LNG tanks often include a double-walled construction with the space between the walls evacuated of air or otherwise insulated.

A problem encountered with LNG fuel systems is that if a storage tank filled with LNG is allowed to sit without being used, heat will be transferred to the LNG causing it to vaporize and build pressure in the storage tank. Prior art systems often vent the pressurized natural gas to the atmosphere to regulate the pressure within the tank.

While such venting itself is not hazardous, natural gas is flammable and may present a fire hazard at the vent stack where open flames or sparks in the vicinity of the vent stack can ignite the venting gas. Additionally, any venting represents a loss of fuel that goes to waste instead of powering the vehicle. Such conditions obviously are undesirable.

As a result, arrangements for relieving the pressure within LNG tanks without venting to the atmosphere have been developed. One such arrangement is illustrated in FIG. 1 wherein an economizer circuit is indicated in general at 14. A withdrawal line 10 communicates through a heat exchanger 12 with a dip tube 8 that is submersed within the LNG 4 stored in tank 2. Due to the pressure within the tank 2, LNG is forced through dip tube 8 and is vaporized in heat exchanger 12. Gas may then be provided to a use device through withdrawal line 10. The economizer circuit 14 includes a line 16 connecting the gas head 6 to the withdrawal line 10. A regulator 18 is located in the line 16 and allows vapor to be delivered to the use device from gas head 6 when the pressure in the tank rises above the predetermined level set at regulator 18. By pulling vapor from gas head 6, instead of liquid through dip tube 8, the pressure in tank 2 falls dramatically.

LNG is preferably stored in vehicle-mounted tanks at a pressure of up to approximately 200 psig. Low pressure tanks maximize the advantages of LNG storage as LNG is denser at lower pressures thus enabling more fuel to be stored in low pressure tanks. For engines that operate at pressures at or below 200 psi, the fuel delivery system is that shown in FIG. 1. However, some engines have direct gas injection at pressures as high as 3000 psi. As a result, in addition to an onboard LNG storage tank and a vaporizer, the LNG fuel storage and supply system of a vehicle typically includes a pump. The low-pressure LNG from the storage tank is pumped as a liquid up to the engine's operating pressure, is vaporized and delivered to the engine as a high pressure gas, typically in the range of 500 psig to 3000 psig.

A major disadvantage of such systems is the inability of the pump to reduce the tank pressure as it operates. The problem is compounded in that, in addition to the heat entering the liquid through the tank insulation, heat generated by the pump itself causes the pressure in the onboard tank to rise. If the pressure in the tank is not relieved, it may build up to relief valve pressure while in use and vent while traveling down the road. It definitely will have to be vented down to low pressure when the vehicle comes to the filling station to be refueled.

Prior art economizer systems, such as the one illustrated in FIG. 1, are not suitable for use with onboard LNG storage and supply systems featuring a pump. This is because the two portions of the LNG use/withdrawal line communicate with either the pump inlet or the pump outlet. Since most cryogenic pumps are incapable of pumping vapor, connecting the outlet of the economizer circuit (14 in FIG. 1) to the pump inlet via the LNG use/withdrawal line is not an option. Furthermore, the pressure of the portion of the LNG use/withdrawal line that communicates with the outlet of the pump is at a pressure higher than the tank's operating pressure, so connecting the outlet of the economizer circuit there is also not an option. A need therefore exists for an economizer system that works with a pumped LNG system.

Accordingly, it is an object of the present invention to provide a natural gas fuel storage and supply system for vehicles that does not vent the onboard fuel storage tank to the atmosphere while in use or during refueling.

It is another object of the present invention to provide an economizer circuit that works with natural gas fuel storage and supply system for vehicles that feature pumps.

It is still another object of the present invention to provide a natural gas fuel storage and supply system for vehicles that permits low-pressure, onboard LNG storage tanks to be used.

SUMMARY OF THE INVENTION

The present invention is directed to a natural gas fuel storage and supply system for vehicles. The system features an insulated tank containing a supply of liquid natural gas (LNG) with a headspace there above. A pump is in communication with the tank and a vaporizer is in circuit between the pump and the vehicle engine so that liquid cryogen from the tank is transferred to the vaporizer when the pump is activated. As a result, pressurized LNG vapor is produced and supplied to the engine of the vehicle for use as fuel.

A vapor line is connected between the headspace of the tank and the air intake of the vehicle engine. A control valve is positioned in the vapor line and opens when the engine of the vehicle is in operation. A regulator is also positioned within the vapor line and is set to open when a predetermined pressure within the tank headspace is reached. As a result, when the engine is in operation, and the regulator is open, vapor from the headspace of the tank travels to the air intake of the vehicle engine so that pressure within the tank is relieved. A flow control device is in circuit between the regulator and the air intake of the vehicle engine and is sized to prevent the air and LNG vapor mixture that is produced at the engine air intake from being combustible. The control device may be an orifice, a flow control valve or any other flow control device known in the art.

The following detailed description of embodiments of the invention, taken in conjunction with the appended claims and accompanying drawings, provide a more complete understanding of the nature and scope of the invention.

DESCRIPTION OF THE PREFERRED EMBODIMENTS

It is to be understood that while the present invention is described below in terms of a natural gas fuel storage and supply system for vehicles powered by liquid natural gas (LNG), the system of the present invention may be used to store and supply a variety of alternative cryogenic liquids to a variety of alternative use devices. For example, the inventive fuel storage and supply system can be used with engines relating to compressors, generators, heating and air conditioning systems and virtually any other system where an engine is required.

Figure 1:
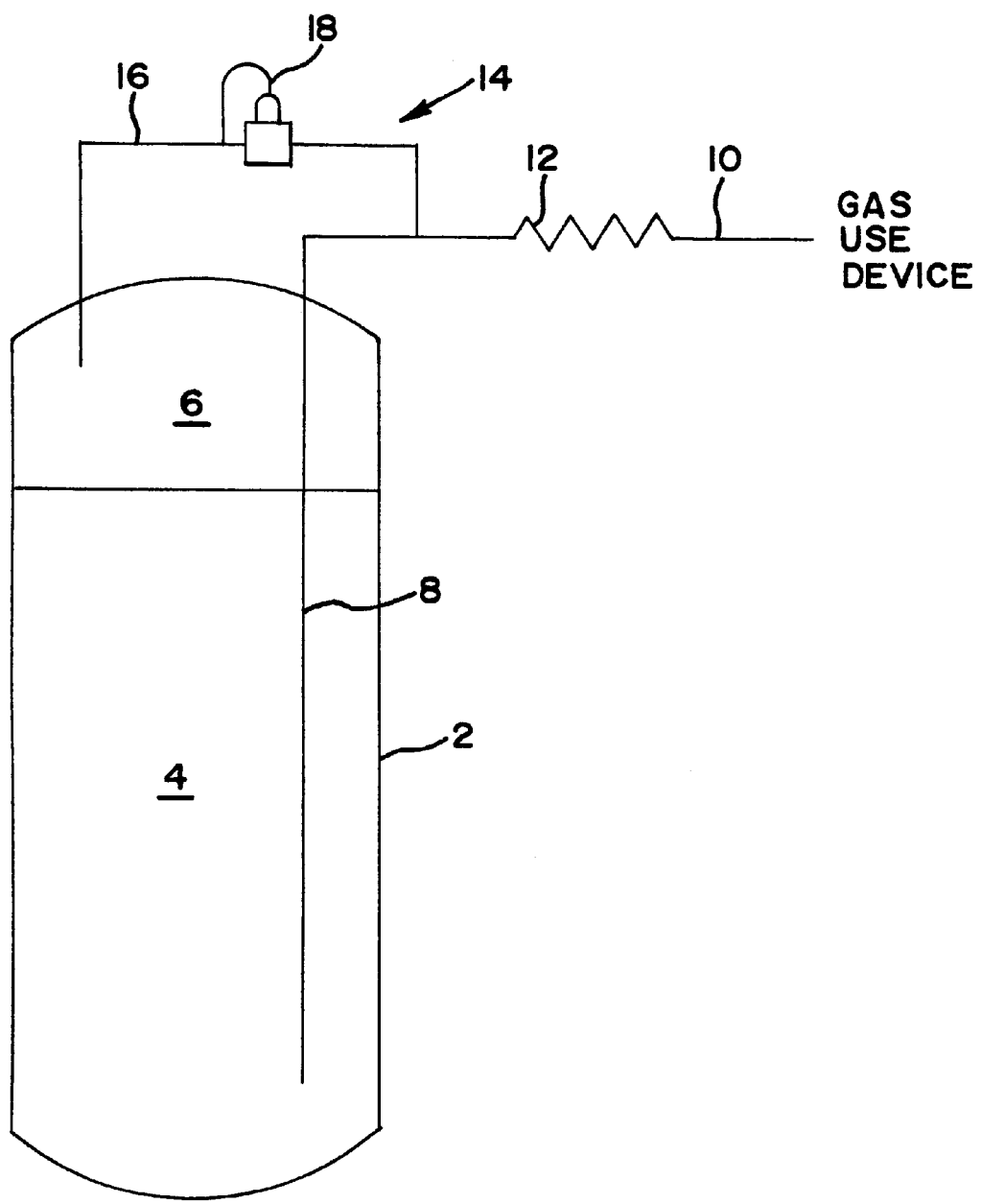
FIG. 1 is a schematic view of a prior art economizer circuit.
Figure 2:
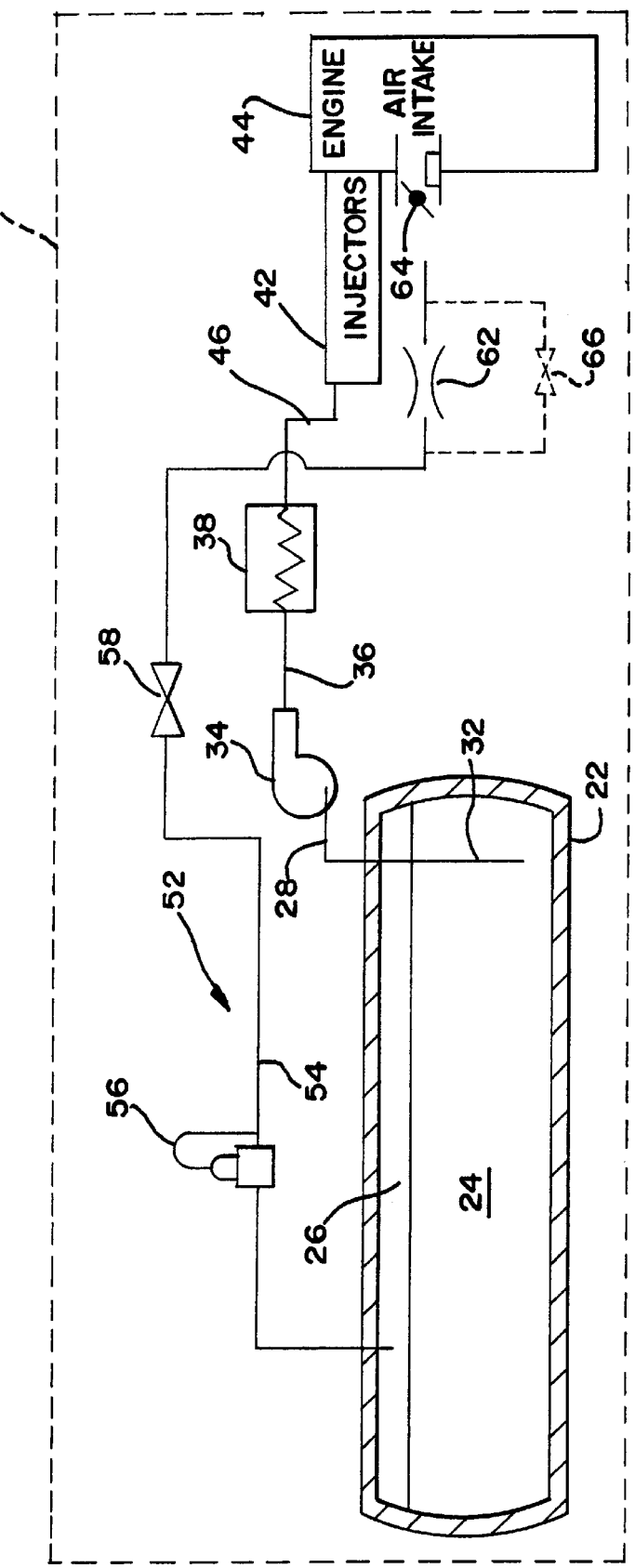
FIG. 2 is a schematic view of an embodiment of the natural gas fuel storage and supply system of the present invention.

With reference to FIG. 2, an embodiment of the natural gas fuel storage and supply system of the present invention is illustrated. The system is mounted on an LNG-powered vehicle indicated in phantom at 20. An insulated tank 22 contains a supply of LNG 24 with a headspace 26 above containing LNG vapor. The pressure of the LNG in the tank is approximate 50 psig. The tank is a horizontal storage tank and is of the type commonly used as fuel tanks on vehicles where the tank is mounted to the underside of the vehicle. The tank and associated components, however, may be mounted to the vehicle by any method known in the art without departing from the spirit or scope of the invention.

One end of a pump inlet line 28 communicates with a dip tube 32 that is submersed in the LNG 24. The opposite end of the pump inlet line 28 communicates with a cryogenic pump 34. Suitable pumps are known in the prior art and may be of either the centrifugal or reciprocating piston type, and may be external or submerged. The outlet of the pump 34 communicates with a pump outlet line 36 which communicates with a heat exchanger or vaporizer 38. The outlet of the vaporizer communicates with the injectors 42 of the vehicle engine 44 through a vaporizer outlet line 46. Vaporizer 38 may optionally be heated using a variety of methods known in the art. These include recirculating coolant from the engine or electric heating devices.

In operation, when pump 34 is activated, LNG is withdrawn from the tank 22 through dip tube 32 and is pumped up to a pressure of approximately 500 to 3000 psig by the pump. The pressurized LNG is then transferred to the vaporizer 38 where LNG gas at a pressure of approximately 500 to 3000 psig is produced. The pressurized LNG gas is then delivered to the injectors of the vehicle engine where it is consumed as fuel. The injectors, and thus the demand for fuel, is controlled by the vehicle's throttle or gas pedal.

As explained previously, the pressure within tank 22 will increase as LNG 24 evaporates and the resulting vapor fills the head space 26. This may occur due to heat generated by the pump 34 that is transferred back to the tank 22. In addition, leaks through the tank walls occur. Such heat leaks can be particularly problematic as the vehicle sits for an extended period of time.

To address pressure buildup within the tank 22, the system of FIG. 2 is provided with a novel economizer arrangement, indicated in general at 52. An LNG vapor line 54 communicates with the head space 26 of the tank and is provided with a regulator 56 which is set to open when the pressure within the tank 22 reaches a predetermined value, for example, 60 psig. Suitable economizer regulators or valves are known in the art and may be purchased, for example, from Chart Inc. of Burnsville, Minn. The LNG vapor line 54 is also provided with a control valve 58 and an orifice 62. The portion of the LNG vapor line exiting the orifice communicates with the air intake of the engine 64.

When the engine 44 of the vehicle 20 is operating, the control valve 58 is open. As stated previously, if the pressure in the tank reaches a predetermined value, the regulator 56 opens so that LNG vapor from the headspace 26 flows to the air intake 64 of the vehicle engine. As a result, the LNG vapor mixes with the air entering the vehicle engine where it simply burns up with the ignited fuel charge coming from the vehicle injectors 42. Due to the resulting reduction of vapor, the pressure in the tank 22 is lowered.

The restricting orifice 62 limits the flow rate of the LNG vapor so that the intake air traveling through intake 64 is never combustible itself, typically less than 2% methane concentration. This enables the intake air to be treated normally whereby it may pass through turbochargers and other hot components without the worry of fire.

While the orifice 62 of FIG. 2 is preferred due to its simplicity and for cost considerations, it should be noted that a flow control valve, illustrated in phantom at 66, may be substituted for the orifice. In addition, other flow restriction devices known in the art may be substituted for the orifice and flow control valve illustrated in FIG. 2.

It should be noted that while one tank 22 is illustrated in FIG. 2, additional on-board tanks may be added to provide the vehicle with additional LNG storage capability, and thus, extended range. Each such tank would have its own dip tube and pump inlet line which could selectively be placed in communication with pump 34. In addition, each additional tank would be provided with its own economizer circuit 52 that would communicate with control valve 58, orifice 62 (or flow control valve 66) and air intake 64 so that pressure buildups in the additional tanks could also be relieved without venting to the atmosphere.

The system of FIG. 2 thus permits a vehicle-mounted LNG storage tank 22 to remain at low pressure during its daily operation so that it does not need to be vented to be refilled. In addition, the system does so without the risk of fire or other harm to the vehicle engine components. The system therefore presents a significant and important breakthrough as interest in alternative fuels such as LNG builds and advances in cryogenic pumping technology continue to be made.

While the preferred embodiments of the invention have been shown and described, it will be apparent to those skilled in the art that changes and modifications may be made therein without departing from the spirit of the invention, the scope of which is defined by the appended claims.

What is claimed is:

1. A cryogenic fuel storage and supply system for a use device comprising:

a) an insulated tank containing a supply of liquid cryogen with a headspace there above;

b) a pump in communication with the tank and adapted to communicate with an engine of the use device so that cryogen is pumped to the use device engine when the pump is activated;

c) a vapor line connected to the headspace of the rank and adapted to communicate with an air intake of the use device engine independent of the pump; and d) a regulator positioned within said vapor line, said regulator set to open when a predetermined pressure within the tank headspace is reached so that when the regulator is opened, vapor from the headspace travels to the air intake of the use device engine so that pressure within the headspace is reduced.

2. The system of claim 1 further comprising a vaporizer in circuit between the pump and the use device engine so that liquid cryogen from the tank is transferred to the vaporizer when the pump is activated so that vapor is produced and supplied to the engine of the use device.

3. The system of claim 1 further comprising a flow control device in circuit between the regulator and the air intake of the vehicle engine, said regulator limiting the travel of vapor to the air intake so that gas traveling through the air intake is not combustible.

4. The system of claim 3 wherein the flow control device is an orifice.

5. The system of claim 3 wherein the flow control device is a flow control valve.

6. The system of claim 1 further comprising a control valve positioned in said vapor line, said control valve opening automatically when the engine of the use device is in operation.

7. The system of claim 1 wherein said liquid cryogen is liquid natural gas.

8. The system of claim 1 where said use device is a vehicle.

9. An economizer circuit for a tank containing a supply of liquid cryogen with a headspace there above, where the tank provides cryogen to an engine of a use device for use as fuel, the economizer circuit comprising:

a) a vapor line adapted to communicate with hot die headspace of the tank and an air intake of the use device engine;

b) a regulator positioned within said vapor line, said regulator set to open when a predetermined pressure within the tank headspace is reached so that when the regulator is opened, vapor from the headspace travels to the air intake of the use device engine so that pressure in the headspace is reduced; and c) a flow control device in circuit between the regulator and the air intake of the use device, said flow control device limiting the travel of vapor to the air intake so that gas traveling through the air intake is not combustible.

10. The system of claim 9 wherein the flow control device is an orifice.

11. The system of claim 9 wherein the flow control device is a flow control valve.

12. The system of claim 9 further comprising a control valve positioned in said vapor line, said control valve opening automatically when the engine of the use device is in operation.

13. The system of claim 9 wherein said liquid cryogen is liquid natural gas.

14. The system of claim 9 where said use device is a vehicle.

15. A method for relieving pressure in a tank containing a supply of liquid cryogen with a headspace there above, where the tank provides cryogen to an engine of a use device via a liquid pump and a liquid line for use as fuel, comprising the steps of:

a) detecting a pressure level in the tank; and b) transferring cryogenic vapor from the headspace of the tank to an air intake of the use device engine via a line independent of the liquid line when the detected pressure in the tank exceeds a predetermined level.

16. The method of claim 15 further comprising the step of restricting a flow rate of the cryogenic vapor as it is transferred from the headspace of the tank to the air intake of the use device engine so that gas traveling through the air intake is not combustible.

17. The method of claim 15 further comprising the step of mixing the cryogenic vapor transferred from the headspace of the tank with air entering the air intake of the engine so that an air and cryogenic vapor mixture is produced.

18. The method of claim 17 further comprising the step of combusting the air and cryogenic vapor mixture with additional cryogen from the tank in the engine of the use device.

19. The method of claim 15 wherein the liquid cryogen is liquid natural gas and the use device is a vehicle.

* * * * *

UNITED STATES PATENT AND TRADEMARK OFFICE
CERTIFICATE OF CORRECTION

PATENT NO. : 6,698,211 B2
DATED : March 2, 2004
INVENTOR(S) : Keith Gustafson

It is certified that error appears in the above-identified patent and that said Letters Patent is hereby corrected as shown below:

Column 5,
Line 3, delete "vapor line connected to the headspace of the rank" and insert therefor:
-- vapor line connected to the headspace of the tank --
Line 38, delete "a)a vapor line adapted to communicate with hot die" and insert therefor: -- a)a vapor line adapted to communicate with both the --

Signed and Sealed this

Tenth Day of August, 2004

JON W. DUDAS
*Acting Director of the United States Patent and Trademark Office*